2 Sheets—Sheet 1.

AULTMAN & MILLER.

Mower.

No. { 140, 1,243. }

Reissued Dec. 10, 1861

N. PETERS, PHOTO-LITHOGRAPHER, WASHINGTON, D. C.

AULTMAN & MILLER.
Mower.
No. { 140. / 1,243. }
Reissued Dec. 10, 1861
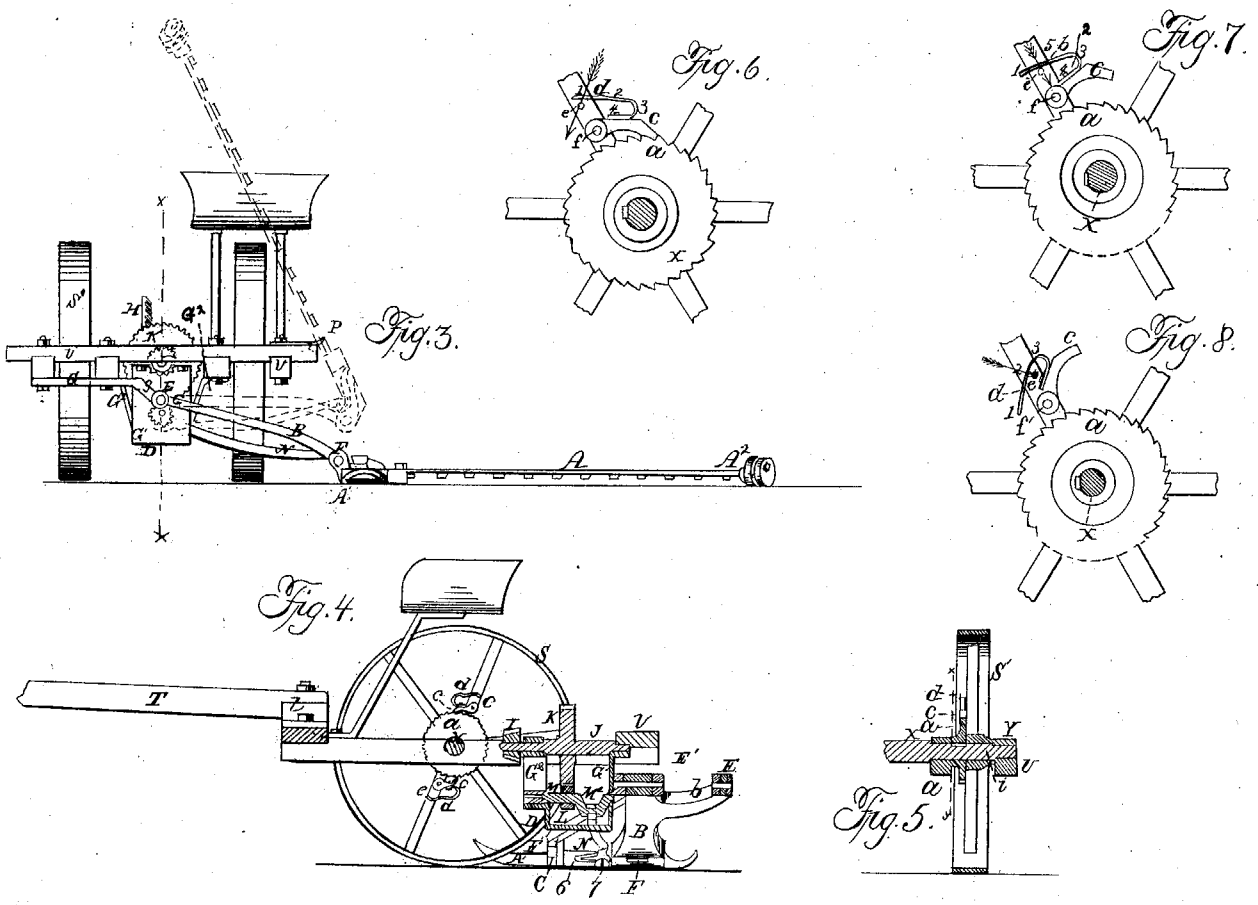
N. PETERS, PHOTO-LITHOGRAPHER, WASHINGTON, D. C.

UNITED STATES PATENT OFFICE.

C. AULTMAN AND L. MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 775, dated July 19, 1859; Reissue No. 1,243, dated December 10, 1861.

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 1:
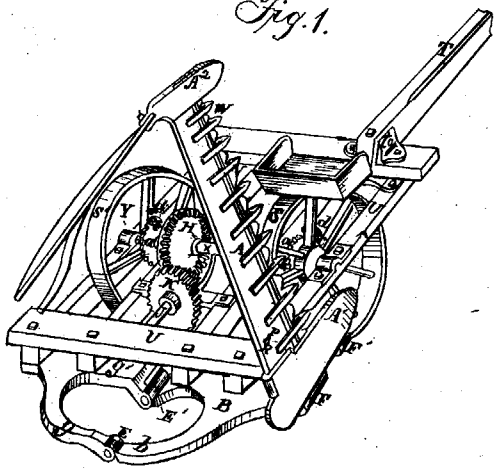
Figure 2:
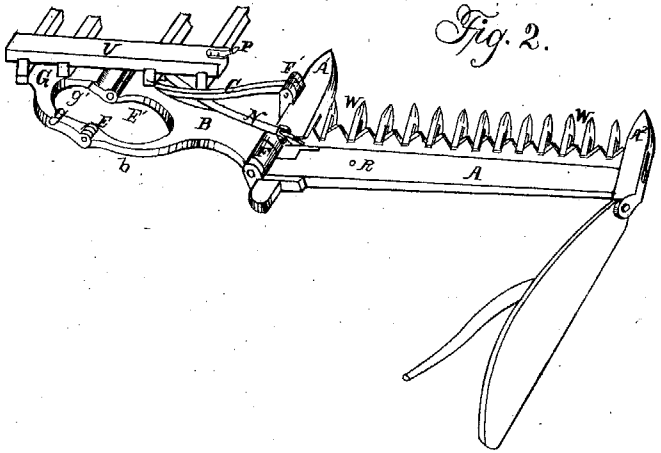

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine with the finger-beam extended upon the ground ready for mowing. Fig. 3 represents an elevation of the rear of the machine, showing particularly the relative positions of the parts when the finger-beam is down on the ground, ready for work, and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through the wheel and axle. Fig. 6 represents a transverse section at the line *x x* of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure; and Fig. 8 represents the view of the parts shown in Fig. 6, but with the spring and pawl in a third position different from those shown in Figs. 6 and 7.

We term that side of the machine the "right" side which would be at the right hand of a person behind the machine and looking toward it, and the opposite side of the machine we term its "left" side.

In machines for mowing and reaping it is desirable to drive the gearing which vibrates the cutter from one only of the main wheels which carry the machine, allowing the other carrying-wheels to run freely independently of that which is used as a driver. It so happens, however, that the adhesion of one of the carrying-wheels to the ground is not always sufficient to overcome the resistance opposed to the motion of the cutter, and under such circumstances the driving-wheel slips on the ground without rotating, the cutter ceases to act at the same time, (for its motion is derived from the rotation of the driving-wheel,) and a balk is made in the mowing or reaping, as the case may be.

Such a case of the slipping of a driving-wheel is most likely to occur when it is passing over cut grass, or over uncut grass of the old crop lying on the ground, so as either to prevent the tread of the driving-wheel from biting upon the earth at all or causing it to bite less firmly than usual. To avoid this difficulty both the carrying-wheels of the machine have been connected with the gearing and made drivers, so that in case one should accidentally fail to have a good hold upon the ground the deficiency might be compensated by the other, as both would seldom fail at the same time to have a good hold. The plan of making both the carrying-wheels drivers, while it proved effectual for working the cutter, rendered the machine extremely difficult to guide, especially in turning corners, and made it hard to back. Moreover, it increased the draft and the wear and tear and the greater part of the time without any countervailing advantages, as when the wheels ran directly on the stubble in reaping or in mowing, on hard sward free from old grass, on smooth ground of any kind where the crop is light, or in drawing the machine from place to place where the work is to be done. With a view to avoid these last-named objections, one or both of the wheels have been rendered capable of being disconnected from the gearing and allowed to run loose. None of these plans have proved saisfactory in practice, for although they have afforded a remedy for the difficulties already mentioned they have done so at the expense of too much complexity of mechanism, which it is the object of our improvement to avoid.

The accompanying drawings represent a mowing-machine whose gearing is arranged within a frame, U, supported by two large wheels, S S′, on an axle, X, which is common to both the wheels, and likewise to the main gear-wheel H, which is firmly keyed to it, so that whenever the axle turns the gear-wheel will also turn, and when the axle ceases to turn so will the gear-wheel also cease to turn. On each end of the axle is a journal fitted to a bearing in a box, Y, on the top of the side beam of the main frame. Within each of these journals is another journal, *i*, Fig. 5, which fits loosely in the eye of the supporting-wheel, so that the wheel can revolve freely on this journal or bearing of the axle.

A ratchet-wheel, *a*, is keyed firmly to the axle, at the inner ends of each of the bearings *i*, the ratchet-teeth being inclined in a direction opposite to that in which the supporting-wheels S S′ revolve when the machine is going forward.

To the inside of one of the arms of each supporting-wheel a pawl, *c*, is pivoted, with its toothed end pointing in the direction in which the supporting-wheels revolve. When the teeth of these pawls are depressed they engage with the teeth of the ratchet-wheels, and when the machine is moving forward they lock the supporting-wheels S S′, the axle X, and the gear-wheel A together, so as to make both supporting-wheels co-operate in driving the gearing.

For the purpose of preventing the pawls from being thrown out of gear with the ratchet-wheels by the jolting of the machine when at work, and thereby stopping the cutter and making a balk in the mowing, a curved spring, *d*, is attached to the back of each pawl, which bears upon a pin, *e*, on the side of the arm of the wheel, near the pivot of the pawl, as shown in Figs. 4 and 6, and tends constantly, when in this position, to press the pawl into gear with the ratchet-teeth. This spring is designed not only to hold the pawl in gear with the ratchet-teeth when engaged therewith, but also to hold it out of gear when disengaged therefrom to prevent the jolting of the machine from accidentally connecting the carrying and gear wheels by throwing the tooth of the pawl down into gear with the ratchet-wheel, and thereby producing a shock that would be very likely to break the gearing. The action of this spring-pawl is illustrated by Figs. 6, 7, and 8, in which the pawl *c* is of the usual form, and has a spring, *d*, bent into a form represented, attached to its back. The acting portion of the spring is between the points 1 and 2, and the portion between 3 and 4 is merely for the purpose of fastening it to the pawl and holding the acting portion in a position nearly parallel to a line drawn from the center of the pivot *f* to the tooth of the pawl, and at a distance from that line a little less than the distance between the center of the pin *e* on the arm of the wheel for the spring to bear against and the center of the pivot *f* of the pawl, so that it will be necessary, in setting the pawl on its pivot and the spring on that side of the bearing-pin *e* next the periphery of the wheel, to deflect the spring until its tension at the middle point, 5, Fig. 7, in the acting part of the spring will be equal to about double the force which it is required to exert upon the pawl to hold its tooth either in or out of gear with the ratchet-teeth. In the position shown in Fig. 7, when the middle 5 of the acting part of the spring is bearing upon the pin in the arm the pressure of the spring is in the direction of a line drawn through the centers of the pivot of the pawl and the bearing-pin, and therefore does not tend to depress or raise the pawl on either side of its pivot, and leaves it equally free to be turned either way, and this point 5 in the spring we have therefore designed as its neutral point, since, however hard it may press upon the bearing-pin, such pressure has no tendency to move the pawl. If the pawl be now turned on its pivot so as to depress its tooth, as in Fig. 6, into gear with the ratchet-teeth, the bearing of the spring upon the pin will be changed from the point 5 to the point *i*, behind the neutral point 5, and the direction of the pressure will be in a line passing through the bearing-pin a considerable distance behind the pivot of the pawl, and will tend to raise the rear end of the pawl and depress its toothed end, thereby holding it in gear with the ratchet-teeth. If the pawl be now turned on its pivot to raise it from the position shown in Fig. 6 to the position shown in Fig. 8, the bearing of the spring upon the pin will be at a point, 2, between the neutral point 5 and the tooth of the pawl, and the direction of the pressure will be in a line passing through the bearing pin a considerable distance in front of the pivot of the pawl, and will of course tend to hold up the tooth of the pawl out of gear with the ratchet-wheel.

What we claim under this patent as our invention is—

Mounting the two driving-wheels and one main gear-wheel upon a common axle, in combination with a ratchet-wheel for each driving-wheel, each ratchet-wheel fitted with a pawl that can be made to stand in or out of gear with the ratchet-teeth at will, the whole arranged and operating substantially as described.

CORNELIUS AULTMAN.
LEWIS MILLER.

Witnesses:
DANL. FONNER,
WM. BARBER.